United States Patent Office 2,844,352
Patented July 22, 1958

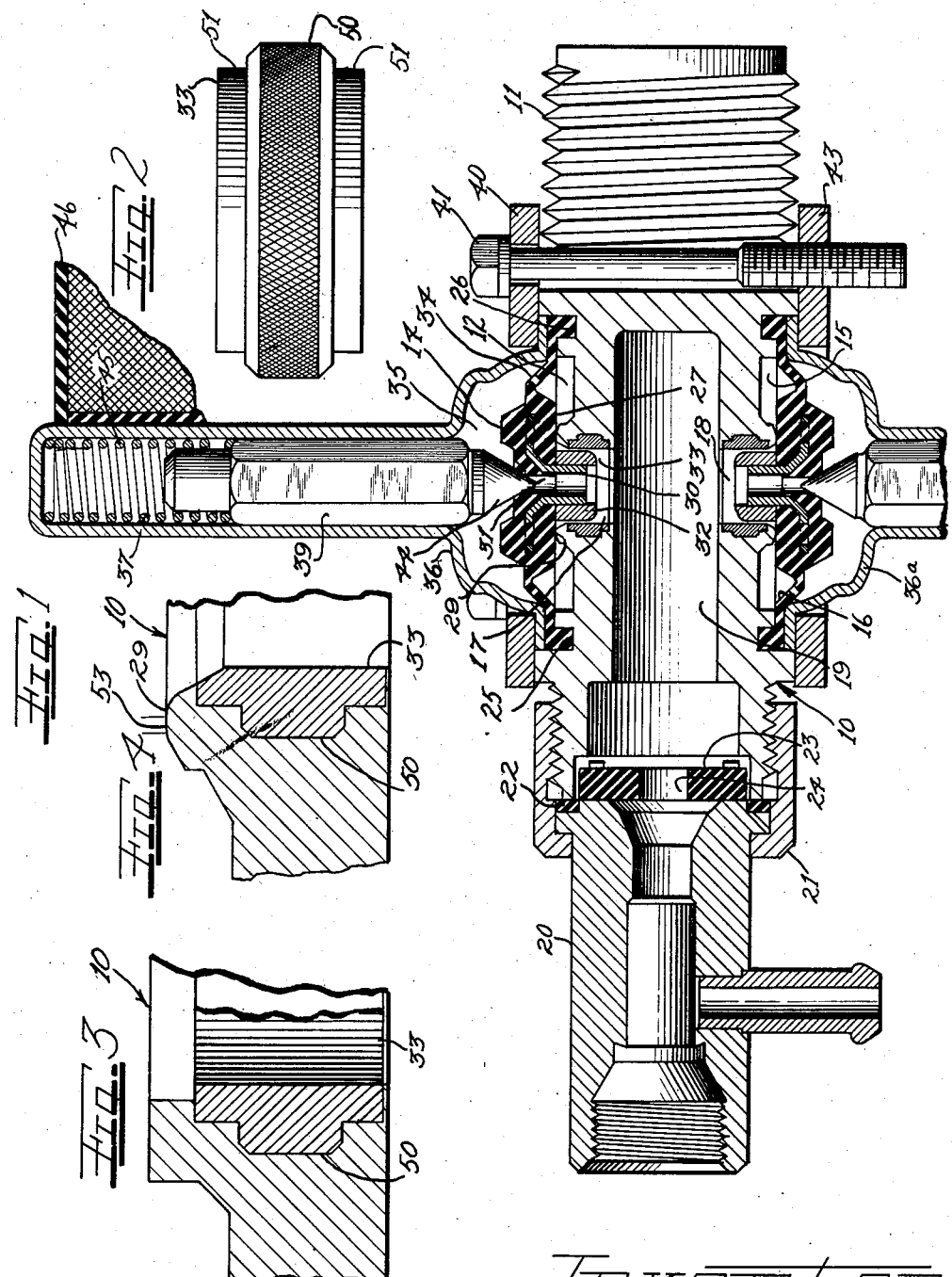

2,844,352

THERMOPLASTIC VALVE

Robert R. Dahl, Chicago, Ill., assignor to The Dole Valve Company, Chicago, Ill., a corporation of Illinois Application December 31, 1954, Serial No. 479,046

7 Claims. (Cl. 251—48)

This invention relates to improvements in valves and more particularly relates to an improved form of pressure operated diaphragm valve in which the valve body is made from a thermoplastic material, and to an improved method of making the body for the valve.

Heretofore, pressure operated valves having a diaphragm coming into engagement with a seat surrounding a port in the valve body, to block the flow of fluid through the port have been made with molded thermoplastic valve bodies, one commonly used material being a nylon thermoplastic material. Such valves, while generally satisfactory, have had an objectionable and harmful water hammer which has been difficult to cure due to distortion of the nylon under the presence of water and/or heat.

Attempts have been made to reduce this water hammer by providing a resistance to the movement of the diaphragm in a valve closing direction. One way of reducing this water hammer has been by molding an insert in the diaphragm to extend from the face of the diaphragm and by placing a metal grommet on the extending portion of the insert so as to provide a relatively close fit between the insert and the wall of the port and thus provide a throttling action during valve closing movement.

While this has minimized water hammer, it has not eliminated it, due to distortion of the nylon and the resultant variations in clearance between the grommet and port wall.

Another attempt to remedy this difficulty has been by providing a metal insert in the valve body which defines the valve seat and wall of the port. Such inserts have not been practical due to leakage between the metal insert and the nylon body.

I have discovered, as a result of the foregoing efforts to reduce water hammer of the valve that where the diaphragm seats against a thermoplastic seat, and the wall of the port into which the valve fits is metal, that a sufficiently close fit may be provided between the valve and the metallic wall of the port to effect a slow closing of the valve and entirely eliminate harmful water hammer and leakage between the valve body and the insert.

It is, therefore, an object of my present invention to remedy the foregoing difficulties by providing a thermoplastic-bodied, pressure-operated valve having an annular seat and a port leading therefrom, in which the valve seats against a thermoplastic seat and the wall of the port opening leading from the seat is made from metal.

Another object of my invention is to provide a pressure operated diaphragm valve having a thermoplastic valve body in which a metal insert is molded in the diaphragm valve and extends therefrom and has a grommet carried thereby, providing a close fit between the grommet and a wall of the port closed by the valve, so as to provide a slow closing valve and eliminate harmful water hammer effects.

A still further object of my invention is to provide a slow closing pressure operated diaphragm valve in which the harmful effects of water hammer are eliminated in a simple and expeditious manner.

Still another object of my invention is to provide a valve body of a thermoplastic material in which the valve seat is formed integrally with the body of the valve and in which the wall of the port leading from the seat is formed from a metal insert molded within the body of the valve.

These and other objects of my invention will appear from time to time as the following specification proceeds and with reference to the accompanying drawing wherein:

Figure 1 is a longitudinal sectional view taken through a solenoid controlled pressure operated diaphragm valve constructed in accordance with my invention, with the solenoid coils for controlling operation of the valve broken away;

Figure 2 is a view in side elevation of the bushing, for positioning in the port wall of the valve;

Figure 3 is a fragmentary view showing the metallic bushing in position in the port wall at the completion of the molding operation; and Figure 4 is a fragmentary sectional view showing the port and bushing after the machining operation thereof.

In the embodiment of my invention illustrated in the drawing, I have shown a section through a mixing valve of a type somewhat similar to that shown in the James K. Lund application Serial No. 229,983, filed June 5, 1951, and entitled "Fluid Mixing Valve," issued July 5, 1955, Patent No. 2,712,324. The valve, therefore, need only be shown herein in sufficient detail to fully disclose the novel features of my present invention.

The valve is shown as having a valve body 10 which may be cast or molded from one of the well known thermoplastic materials, and is then drilled and machined as required. One such thermoplastic material which has been found to withstand the high water temperatures encountered in valves used for washing and dishwashing machines and other domestic appliances is a nylon thermoplastic material. Other suitable materials are arcylic thermoplastic materials.

The valve body 10 is shown as having an inlet 11 for water at one temperature. It is also provided with an inlet (not shown) for water at a different temperature. The inlets lead to opposite sides of the valve body, one inlet 11 leading to an annular passageway 12 within the inner margins of a diaphragm 14 and opening to the outside of the valve body. The other inlet (not shown) leads to a similar annular passageway 15 opening to the opposite side of the valve and enclosed by the inner margins of a diaphragm 16 on the opposite side of the valve body 10.

The annular passageways 12 and 15 are enclosed by the respective diaphragm valves 14 and 16, respectively, and have communication with port openings 17 and 18 leading to a central passageway or mixing chamber 19. The mixing chamber 19 extends along the valve body and opens from the opposite end of the valve body from the hot and cold water inlets, and is shown as having a fitting 20 coupled thereto by a coupling member 21 and sealed to the end of the outlet passageway as by a seal 22.

The outlet fitting 20 forms the outlet for the valve and is shown as having a resilient flow control annulus 23 seated at its inlet end. The flow control annulus 23 is a well known form and has a central orifice 24 leading therethrough of a smaller diameter than the diameter of the passageway leading through the fitting 19, to effect a restriction in the cross-sectional area of the orifice 24 upon predetermined increases in pressure so as to provide a substantially uniform flow through the outlet from the valve for varying pressure conditions.

The diaphragm valves 14 and 16 are each of a similar construction so one only need herein be shown or described in detail. The diaphragm valve 14 is preferably formed from rubber and elastomer or other like resilient material and has a flange 25 extending along its outer edge and fitting within an annular groove 26 formed within the valve body 16. The diaphragm valve also has a thickened central portion, an inner face 27 of which is engageable with an annular seat 29 extending around the port opening 17 to block the flow of fluid through said port opening.

The thickened central portion of the diaphragm valve 14 is shown as having a flanged metal insert 30 molded therein for reinforcing the same. The insert 30 may be a stamped insert and the flange thereof is shown as being apertured for locking of the rubber of the diaphragm to the insert and as having a tubular portion projecting from the face 27 of the valve and forming a passageway member registering with a central passageway 31 leading through the diaphragm valve. The tubular projecting portion of the reinforcing insert 30 is shown as having a metal grommet 32 fitting thereon and extending within a metallic bushing 33 molded within the valve body, as will hereinafter more clearly appear as this specification proceeds. The grommet 32 and bushing 33 may be made from brass or any other suitable noncorroding metal.

It may be seen from Figure 1 that the grommet 32 has a relatively close fit with the metallic bushing 33 when the valve is moving to a closed position so as to provide a throttling action on the flow of water during valve closing movement by pressure on the outside of the diaphragm of the valve.

The diaphragm valve 14 is also provided with a bleeder passageway 34 outwardly of the thickened portion thereof and leading into a diaphragm chamber 35 formed between the outer side of the diaphragm valve 14 and the inside of an end closure cap 36, having a central integrally formed guide 37 extending therefrom and having an armature 39 guided therein. It is, of course, understood that more than one bleeder passageway may be provided and that the number and size of bleeder passageways governs the speed of valve closing movement and reduces the chances of valve failure due to dirt in the bleed hole.

The end closure cap 36 is shown as abutting the outer peripheral portion of the diaphragm valve 14 and as being retained thereto as by a yoke 40 and machine screws 41 extending through said yoke, and threaded within a yoke 43 engaging an opposite end cap 36ᵃ and retaining the diaphragm valve 16 to the opposite side of the valve body 10 from the diaphragm valve 14.

The armature 39 has an integrally formed conical valve 44 at its lower end, engageable with the passageway 31, leading through the central thickened portion of the valve 14, by a spring 45 seated at one end against the outer end of the armature 39 and at its opposite end in an end wall of the guide passageway 37 of the end cap 36.

The armature 39 forms the armature of a solenoid 46, the coil of which encircles the guide member 37 and is not herein shown or described in detail since it forms no part of my present invention, and is clearly shown in the aforementioned James K. Lund application Serial No. 229,983.

Upon energization of the solenoid 46, the valve 44 on the end of the armature 39 will move out of engagement with the passageway 31 leading through the diaphragm valve. This will relieve pressure within the diaphragm chamber 35. Pressure on the inner or underside of the diaphragm will thus move the valve 14 into an open position out of engagement with the seat 29, to accommodate the flow of fluid through the port 17 into the central mixing chamber 19.

Upon deenergization of the solenoid 46, the spring 45 will engage the valve 44 on the end of the armature 39 with the passage 31 leading through the thickened portion of the valve 14. Fluid under pressure flowing through the bleeder passageway 34 into the diaphragm chamber 35 will then effect closing of the valve.

Referring now in particular to the insert or bushing 33 and the manner in which said bushing is molded within the valve body to form the wall of the port 17, the bushing 33 is shown as having an enlarged diameter central portion 50, which is knurled to provide a surface to be gripped by the thermoplastic material during the molding operation. The bushing 33 also has reduced diameter wall portions 51, 51 on opposite sides of the knurled enlarged diameter central portion thereof to provide shouldered support surfaces on the bushing, holding the bushing within the port opening. The bushing 33 is suitably supported prior to molding, with its outer edge so located that it will be inwardly of the seat 29 at the completion of the molding operation, as shown in Figure 3 which shows the bushing 33 in its position as molded before machining of the seat.

After the molding operation, the valve seat 29 is then machined to provide a generally rounded outer surface with an intermediate flat seating surface indicated by reference character 53 in Figure 4 and engaged by the face 27 of the valve 14 upon closing of the valve 14, to seal the port opening 17 from the passage of fluid therethrough. The outer margin of the wall of the port opening is shown as being machined at an angle, which may be an angle of 30°, the nylon valve body being machined as well as the entering end of the inner margin of the bushing 33.

It may be seen from the foregoing that I have provided a valve and body particularly suited to be molded from a nylon thermoplastic material, in which the seat of the valve is plastic and the wall of the port leading from the seat is metal and spaced inwardly from the seat so as to avoid any leakage of fluid between the seat and metal insert when the valve is closed.

It may further be seen that the metal insert provides a uniform bore into which the metal grommet 32 fits during valve closing movement, which is not subject to the distortions which the nylon body undergoes in the presence of water and heat.

It may also be seen that this provides a relatively close uniform fit between the grommet 32 and bushing 33 so as to provide sufficient resistance to valve closing movement to effect a slow closing valve and eliminate undesirable and harmful water hammer.

It will be understood that modifications and variations of the present invention may be effected without departing from the spirit and scope of the novel concepts thereof as defined by the appended claims.

I claim as my invention:

1. In a fluid pressure operated valve, a thermoplastic valve body having a chamber, a port leading into said chamber and terminating at the outside of said valve body in an annular valve seat, an annular metal insert recessed in the wall of said port in inwardly spaced relation with respect to said seat and having an inner wall forming a portion of the wall of said port, a diaphragm sealed to said valve body and engageable with said seat to block the passage of fluid through said port, and a metallic passageway member extending from said diaphragm for providing a close surface coacting with the inner wall of said insert upon valve closing movement.

2. In a fluid pressure operated valve, a thermoplastic valve body having a central chamber, a port leading into said chamber and terminating at the outside of said valve body in an annular seat, an annular metal insert recessed in the wall of said port in inwardly spaced relation with respect to said seat and having an inner wall defining a major portion of the wall of said port, a diaphragm sealed to said valve body at its periphery and extending over said port and seat and having a thickened central portion having a flat face on the side thereof facing said seat, said diaphragm also having a central passageway leading therethrough and having metal insert reinforcing said thickened portion and extending from said flat face into said port when the valve is closed, said insert having a passageway leading therethrough in registry with said central passageway and having a metal grommet mounted thereon and extending from said flat face for close fitting coaction with the inner wall of said insert upon valve closing movement.

3. In a fluid pressure operated valve, a valve body formed of plastic having an outlet passageway therein, a port communicating with said passageway, a diaphragm valve extending over said port and movable under fluid pressure to engage an end of said port and close the same, said diaphragm having a projecting portion extending within said port during valve closing movement with a relatively close fit therewith, and said port having a metal insert recessed within said valve body inwardly of said end of said port and having an inner wall forming a uniform diameter wall portion of said port to form said relatively close fit with the projecting portion of said diaphragm whereby a throttling of fluid will occur between the projecting portion and metal insert during valve closing movement to slow the closing and reduce water hammer.

4. In a fluid pressure operated valve, a valve body formed of plastic and having an outlet passageway therein, a port communicating with said passageway, a diaphragm valve extending over said port and movable under fluid pressure to engage an end of said port and close same, a tubular projecting portion on said diaphragm valve extending into said port when the diaphragm moves to engagement with the port to close the valve, and a metal insert recessed within said valve body in registry with said port and having an inner wall forming a portion of the wall of said port and being spaced inwardly of said end of said port, the inner wall of said insert having a relatively close fit with said tubular projecting portion whereby a throttling of fluid will occur when the tubular projecting portion moves within the metal insert as the diaphragm valve closes to slow the valve closing.

5. A plastic valve body having an outlet passageway therein, a port communicating with said passageway and terminating at one end in an annular valve seat, valve means for closing said port having an attached tubular portion projecting into said port when moving to closed position, and a metal insert recessed within the wall of said port and having an inner wall forming a continuation of the wall of said port in inwardly spaced relation with respect to said seat to provide a leakproof thermoplastic seat and uniform diameter port leading from said seat, said insert having a relatively close fit with said tubular portion of the valve means to provide a throttling effect on fluid flowing through the port to slow the closing of the valve.

6. In a fluid pressure operated valve, a valve body formed of plastic and having an outlet passageway therein, a port communicating with said passageway and terminating at its outer end in an annular valve seat facing the outside of said valve body, the greater portion of the wall of said port comprising an annular metallic insert recessed within said valve body in inwardly spaced relation with respect to said seat and having an inner wall flush with the wall of said port, said insert having a shouldered outer wall for retaining said insert in said valve body, and a valve member movable to closed position to terminate flow through said port and having a portion projecting into said port with a relatively close fit within said metallic insert to throttle fluid flowing through the port when moving to closed position whereby the closing of the valve is slowed to prevent water hammer.

7. In a fluid pressure operated valve, a valve body formed of plastic and having an outlet passageway therein, a port communicating with said outlet passageway and terminating at its outer end in an annular valve seat facing the outside of said valve body, the greater portion of the wall of said port comprising an annular metallic insert recessed within said body inwardly of said seat and having an inner wall flush with the wall of said port and an outer wall shouldered at opposite ends thereof for restraining said insert from movement with respect to said valve body, and a valve member movable to closed position to terminate flow through said port and having a portion projecting into said port with a relatively close fit within said metallic insert to throttle fluid flowing through the port when moving to closed position whereby the closing of the valve is slowed to prevent water hammer.

References Cited in the file of this patent

UNITED STATES PATENTS

| | | |
|---|---|---|
| 316,588 | Weber | Apr. 28, 1885 |
| 1,999,599 | Smith | Apr. 30, 1935 |
| 2,025,368 | Wissler | Dec. 24, 1935 |
| 2,589,682 | Dudis | Mar. 18, 1952 |
| 2,675,204 | Johnson | Apr. 13, 1954 |
| 2,712,324 | Lund | July 5, 1955 |